United States Patent [19]

Peiffer et al.

[11] Patent Number: 4,710,555
[45] Date of Patent: Dec. 1, 1987

[54] NOVEL POLYAMPHOLYTE COMPOSITIONS POSSESSING HIGH DEGREES OF ACID, BASE, OR SALT TOLERANCE IN SOLUTION

[75] Inventors: Dennis G. Peiffer, East Brunswick; Robert D. Lundberg, Bridgewater, both of N.J.

[73] Assignee: Exxon Research and Engineering Company, Florham Park, N.J.

[21] Appl. No.: 826,229

[22] Filed: Feb. 5, 1986

Related U.S. Application Data

[63] Continuation-in-part of Ser. No. 688,238, Jan. 2, 1985, abandoned.

[51] Int. Cl.$^4$ .................................. C08F 230/04
[52] U.S. Cl. .................................. 526/240; 524/547; 526/287

[58] Field of Search .................. 526/240, 287

[56] References Cited

U.S. PATENT DOCUMENTS 4,460,758  7/1984  Peiffer ..................... 526/287
4,461,884  7/1984  Peiffer ..................... 526/240

Primary Examiner—Christopher Henderson
Attorney, Agent, or Firm—Richard E. Nanfeldt

[57] ABSTRACT

Intramolecular polymer complexes synthesized from acrylamide, sodium styrene sulfonate, and methacrylamidopropyltrimethylammonium chloride, having viscosity-polymer concentration relationships that are invarient with the addition of high levels of acid, base, or salt to the fresh water system. These complexes possess a "balance" between conventional polyelectrolyte and polyampholyte behavior.

11 Claims, 2 Drawing Figures

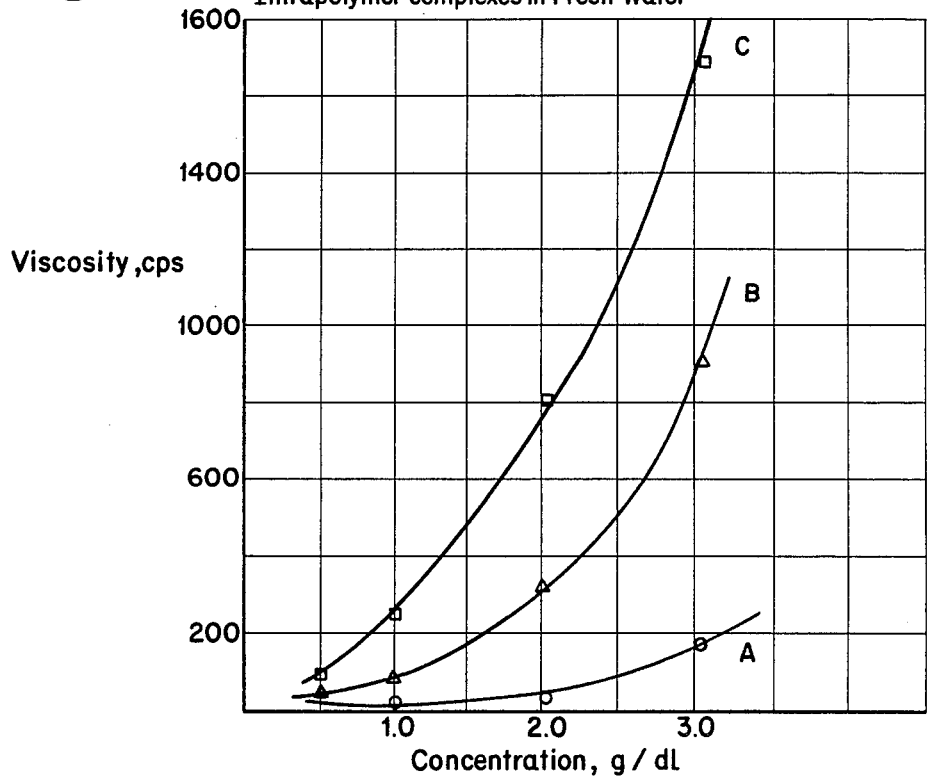
Fig.1 Viscosity Concentration Profiles of 136A, 136B and 136C Intrapolymer complexes in Fresh Water
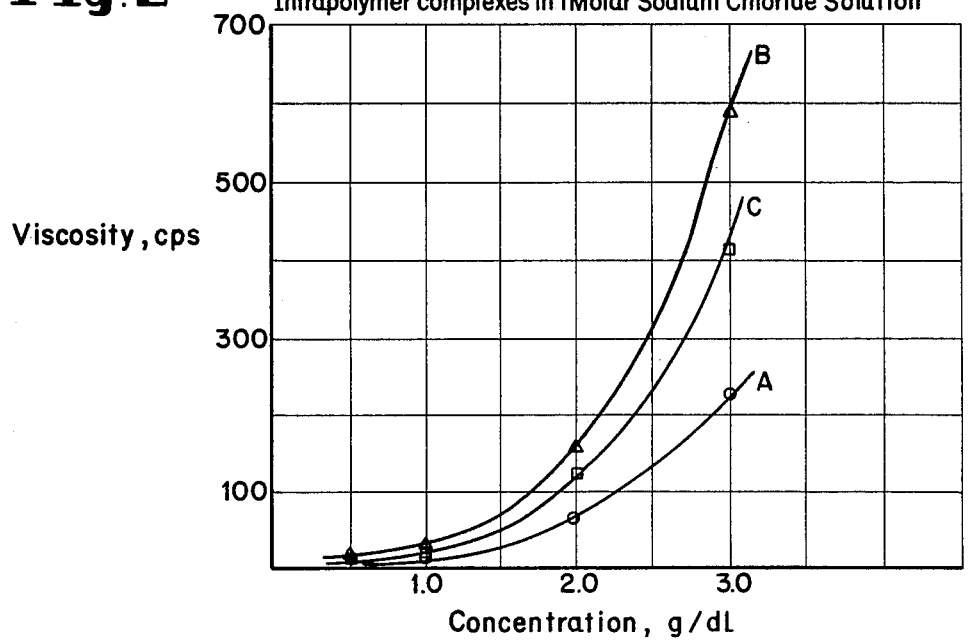
Fig.2 Viscosity Concentration Profiles of 136A, 136B and 136C Intrapolymer complexes in 1 Molar Sodium Chloride Solution

NOVEL POLYAMPHOLYTE COMPOSITIONS POSSESSING HIGH DEGREES OF ACID, BASE, OR SALT TOLERANCE IN SOLUTION

CROSS-REFERENCE TO RELATED APPLICATION

This application is a Continuation-in-Part of copending application U.S. Ser. No. 688,238, filed Jan. 2, 1985, now abandoned which is based on U.S. Ser. No. 560,543 filed Dec. 12, 1983, now abandoned.

FIELD OF THE INVENTION

The present invention relates to improved viscosification agents for a variety of aqueous solution which comprises a family of intramolecular polymeric complexes (i.e., polyampholytes) which are terpolymers of acrylamide/metal styrene sulfonate/methacrylamidopropyltrimethylammonium chloride (MAPTAC). These polymeric materials have viscosity-polymer concentration relationships that are invarient with the addition of high levels of acid, base and salt to the fresh water system.

The metal styrene sulfonate is an anionic monomer, while MAPTAC is cationically charged. These acrylamide-based polyampholytes have approximately 1 to about 50 mole % of the anionic monomer and approximately 1 to about 50 mole % of the cationic moiety present within the macromolecular structure. These groups are not necessarily present in an equimolar charge ratio. The excess undissociated charge allows for facile dispersability of solubility of the polyampholytes into fresh water.

BACKGROUND OF THE INVENTION

In recent years, there has been a renewed interest in the behavior of ion-containing polymers in fresh and high ionic strength aqueous media. These materials have a variety of useful properties, including the ability to expand its hydrodynamic volume in fresh water as the polymer concentration is diluted resulting in an increase in the solution viscosity. It is generally accepted that this expansion is due to the repulsion between like charges chemically bonded to the chain backbone (i.e., polyelectrolyte effect). However, if the influence that each charge has on each other is screened, than the chain will contract and the viscosity will correspondingly decrease. A very effective screening mode becomes operative through the addition of a soluble salt, such as sodium chloride. Therefore, these homogeneously charged polymers are not generally useful viscosifiers in high ionic strength medium.

Recently we have developed a novel class of ionomeric polymers in which cationic and anionic groups are chemically attached to the backbone chain. The hydrodynamic volume of these intramolecular complexes, i.e., polyampholytes, expand with the addition of soluble acids, bases, or salts. This is due primarily to the inability of the ionomeric monomer units to move freely into the bulk solution as found in classical polyelectrolytes. Thus, these complexes are more soluble in high ionic strength solutions than in fresh water and have a higher viscosity in the former than the latter solution. Moreover, an equimolar ratio of anionic and cationic groups are not required for these materials to function effectively.

We report the finding that specific intramolecular polymeric complexes, composed of neutral (acrylamide), cationic(methacrylamidopropyltrimethylammonium chloride), and anionic(sodium salt of styrene sulfonate)monomer units are capable of retaining its fresh water viscosification characteristics with the addition of a soluble salt. That is, the viscosity of these polymer solutions remains essentially unchanged with the addition of acid, base or salt. In qualitative terms, these polymers are polyampholytes with a relatively minor amount of dissociable and mobile charge which counterbalances (via charge screening mechanism) the previously detailed chain expansion. These viscosity characteristics are novel, since the general tendency of homogeneously charged macromolecules in these types of aqueous solutions shows a marked decrease in thickening efficiency.

These novel polymers can be useful in a variety of technologically interesting fluids as required in well control and workover fluids and in other systems where viscosity concentration relationships are required to be invarient with the addition of high levels of salt to the fresh water system.

Typical water soluble monomers incorporated into the terpolymers that are envisioned in the present invention are listed as follows:

Anionic: 2-acrylamido-2 methylpropane sulfonic acid, sodium styrene sulfonate, (meth)acrylic acid, 2-sulfoethylmethacrylate, and the like.

Cationic: methacrylamidopropyltrimethylammonium chloride, dimethyldiallylammonium chloride, diethyldiallylammonium chloride, 2-methacryloxy-2-ethyltrimethylammonium chloride, trimethylmethacryloxyethylammonium, methosulfate, 2-acrylamido-2-methylpropyltrimethylammonium chloride, vinylbenzyltrimethylammonium chloride, and the like.

Nonionic: (N,N-dimethyl)acrylamide, hydroxyethyl(meth)acrylate, alkyl substituted acrylamides, (meth)acrylates, N-vinyllactanes (e.g., n-vinyl-2-pyrrolidone), and the like.

These monomers possess the appropriate water solubility for polymerization to take place.

Salamone et al, of the University of Lowell (Massachusetts), have investigated ampholytic polymers. They have studied the solution properties of divinylic cationic-anionic monomer pairs and also cationic-anionic monomer pairs with a neutral comonomer. This latter group of materials contains styrene as the neutral comonomer (J. Polym. Sci. Al, 18, 2983 [1980]), which can be incorporated into the ampholytic macromolecular structure through both solution or emulsion polymerization schemes. Apparently, other neutral vinylic monomers (i.e., acrylamide) were also polymerized (Gordon Research Conference—1981); but as of the present time, reports of this work have not been published in the scientific literature. However, in all of Salamone's work, detailed descriptions of his synthesis is reported. In all instances, the polymerization of the anionic-cationic monomeric species occurred via an "ion-pair comonomers that have no nonpolymerizable counterions present" (J. Polym. Sci. Letters, 15, 487 [1977]). The physical and chemical properties of these ion-pair comonomers are quite different than the individual ions (J. Polym. Sci. Letters 15, 487 [1977]).

Excess dissociable charges are not present within these polymeric materials.

SUMMARY OF THE INVENTION

The present invention relates to a novel family of intramolecular polymer complexes synthesized from acrylamide, sodium styrene sulfonate, and methacrylamidopropyltrimethylammonium chloride, having viscosity-polymer concentration relationships that are invarient with the addition of high levels of acid, base, or salt to the fresh water system. These complexes possess a "balance" between conventional polyelectrolyte and a polyampholyte behavior.

The polymers of the instant invention have solution properties that remain approximately constant as high levels of acid, base or salt are added to the solution. There is no rise in the solution properties as acid, base or salt is added.

The present invention relates to improved viscosification agents for an aqueous solution which can contain high concentrations of acids, bases, or salts. Typically, the viscosification agents are intramolecular polymeric complexes (i.e., polyampholytes) which are formed by a free radical terpolymerization of acrylamide monomer, sodium styrene sulfonate monomer and methacrylamidopropyltrimethylammonium chloride (MAPTAC) monomer, wherein the formed water soluble terpolymers have the formula:

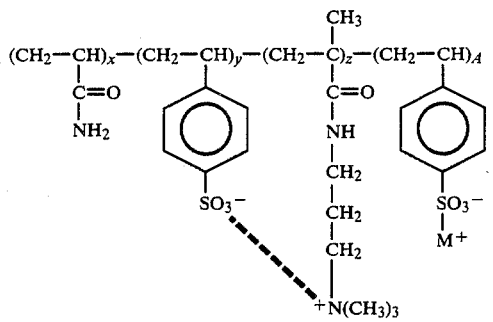

wherein x is about 0.1 to about 50 mole %, more preferably about 1 to about 48 mole %, and most preferably about 3 to about 45 mole %, y is about 1 to about 50 mole %, more preferably about 2 to about 20 mole %, and most preferably about 5 to about 10 mole %; and z is about 1 to about 50 mole %, more preferably about 2 to about 20 mole %, and most preferably about 5 to about 10 mole %, A is about 1 to about 25 mole%, wherein y is equal to z and y, z and A are less than 50 mole % and M is selected from the group consisting of amines and a metallic cation being selected from the group consisting of lead, iron, aluminum, Groups IA, IIA, I Bond IIB of the Periodic Table of Elements. These ionic groups are not present in an equimolar charge ratio, since the excess undissociated charge allows for facile dispersibility of the polyampholytic into fresh water. In addition, this excess charge prevents the hydrodynamic volume of this polyampholyte from expanding or contracting in the previously described acid, base, and salt solutions, thus preventing a viscosity increase upon the addition of acid, base or salt to the aqueous solution containing the terpolymer.

BRIEF DESCRIPTION OF THE DRAWINGS

FIG. 1 illustrates viscosity concentration of the polyampholyte in fresh water.

FIG. 2 illustrates viscosity concentration of the polyampholyte in a 1 molar sodium chloride solution.

GENERAL DESCRIPTION

The instant invention describes a new class of terpolymers which are improved viscosification agents for aqueous solutions containing acid, base, or salt. Typically, these terpolymers are formed by a free radical terpolymerization process in an aqueous medium of an acrylamide monomer, a sodium styrene sulfonate monomer and a methacrylamidopropyltrimethylammonium chloride monomer. The resultant water soluble terpolymer has the formula which possess an excess of sodium styrene sulfonate monomer—the anionic monomer.

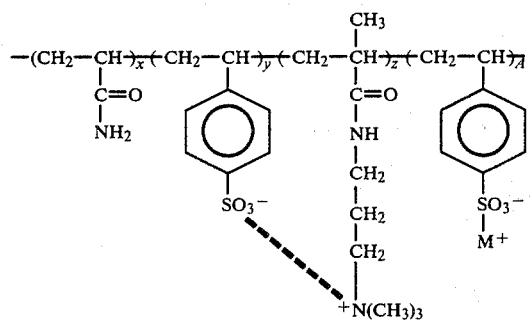

wherein x is about 0.1 to about 50 mole %, more preferably about 1 to about 48 mole %, and most preferably from about 3 to about 45 mole %, y is about 1 to about 50 mole %, more preferably about 2 to about 20 mole %, and most preferably about 5 to about 10 mole %; and z is about 1 to about 50 mole %, more preferably about 2 to about 20 mole %, and most preferably about 5 to about 10 mole %, A is about 1 to about 25 mole%, wherein y is equal to z and y, z and A are less than 50 mole % and M is selected from the group consisting of amines and a metallic cation being selected from the group consisting of lead, iron, aluminum, Groups IA, IIA, I Bond IIB of the Periodic Table of Elements, the ratio of A/y+z should be about 0.1 to about 15 and the ionic content is about 50 to about 99 mole percent.

Several other polymer compositions were synthesized along the identical synthetic route. The composition of these polymers are shown in the following formulae:

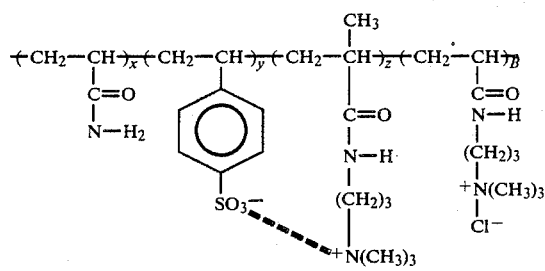

wherein x is about 0.1 to about 50 mole %, more preferably about 1 to about 48 mole %, and most preferably about 3 to about 45, y is about 1 to about 50 mole %, more preferably about 2 to about 20 mole %, and most preferably about 5 to about 10 mole %, and z is about 1 to about 50 mole %, more preferably about 2 to about 20, and most preferably about 5 to about 10, y is equal to z, B is about 1 to 25 mole %, more preferably about 2 to about 20 mole %, and most preferably about 5 to 10 mole %, wherein B, y and z are less than 50 mole % and the ratio of B/y+z is about 0.01 to about 15.

The molecular weight, as derived from intrinsic viscosities, for the terpolymers of acrylamide/sodium styrene sulfonate/methacrylamidopropyltrimethylammonium chloride is about $10^3$ to about $5 \times 10^6$, more preferably about $10^4$ to about $2 \times 10^6$ and most preferably about $10^5$ to about $10^6$. The means for determining the molecular weights of the water soluble terpolymers from the viscosity of solutions of the terpolymers comprises the initial isolation of the water soluble terpolymers, purification and redissolving the terpolymers in water to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark-Houwink relationship.

The water soluble terpolymers of acrylamide/sodium styrene sulfonate/methacrylamidopropyltrimethylammonium chloride are formed by a conventional free radical terpolymerization in an aqueous medium which comprises the steps of forming a reaction solution of acrylamide monomer, sodium styrene sulfonate monomer and methacrylamidopropyltrimethylammonium chloride monomer typically (50 wt. % solution in water) in distilled water, wherein the total monomer concentration is about 1 to about 40 grams of total monomer per 100 grams of water, more preferably about 5 to about 30, and most preferably about 10 to about 20; purging the reaction solution with nitrogen; adding sufficient acid to the reaction solution to adjust the pH of the reaction solution to about 4.5 to about 5.0; heating the reaction solution to at least 55° C. while maintaining the nitrogen purge; adding sufficient free radical initiator to the reaction solution at 55° C. to initiate terpolymerization of the acrylamide monomer, the sodium styrene sulfonate monomer, and the methacrylamidopropyltrimethylammonium chloride monomer; terpolymerizing said monomers of acrylamide, sodium styrene sulfonate and methacrylamidopropyltrimethylammonium chloride at a sufficient temperature and for a sufficient period of time to form said water soluble terpolymer; and recovering said water soluble terpolymer from said reaction solution.

The total concentration of monomers in the polymerization solvent (e.g. water) is about 1 to about 40 grams of total monomer per 100 grams of water, more preferably about 5 to about 30 and most preferably about 10 to about 20. Terpolymerization of the acrylamide monomer, sodium styrene sulfonate monomer, and methacrylamidopropyltrimethylammonium chloride monomer is effected at a temperature of about 30 to about 90, more preferably at about 40 to about 70, and most preferably at about 50 to about 60 for a period of time of about 1 to about 24 hours, more preferably about 3 to about 10, most preferably about 4 to 8.

As is well known to those versed in the art, the level of ionic monomers incorporated in the growing polymer chain is directly related to the initial concentration of the reacting species. Therefore, modulation of the ionic charge within the polymer structure is accomplished through changes in the initial anionic and/or cationic vinylic monomer concentrations.

A suitable method of recovery of the formed water soluble terpolymer from the aqueous reaction solution comprises precipitation in acetone, methanol, ethanol and the like.

Suitable free radical initiators for the free radical terpolymerization of the acrylamide monomers, the sodium styrene sulfonate monomer, and the methacrylamidopropyltrimethyl ammonium chloride monomer are selected from the group consisting of potassium persulfate, ammonium persulfate, benzoyl peroxide, hydrogen peroxide, azobisisobutyronitrile, and the like. The concentration of the free radical initiator is about 0.001 to about 2.0 grams of free radical initiator per 100 grams of total monomer, more preferably about 0.01 to about 1.0 and most preferably about 0.05 to about 0.1.

It should be pointed out that neither the mode of polymerization (solution, suspension, or emulsion polymerization technique and the like), nor the initiator is critical, provided that the method or the products of the initiation step does not inhibit production of the polyampholyte or chemically modify the initial molecular structure of reacting monomers.

Typicaly water soluble monomers incoporated into the terpolymers that are envisioned in the present invention are listed as follows:

Anionic: 2-acrylamido-2-methylpropane sulfonic acid, sodium styrene sulfonate, (meth)acrylic acid, 2-sulfoethylmethacrylate, and the like.

Cationic: methacrylamidopropyltrimethylammonium chloride, dimethyldiallylammonium chloride diethyldiallylammonium chloride, 2-methacryloxy-2ethyltrimethylammonium chloride, trimethylmethacryloxyethylammonium methosulfate, 2-acrylamido-2-methylpropyltrimethylammonium chloride, vinylbenzyltrimethylammonium chloride, and the like.

Nonionic: (N,N-dimethyl)acrylamide, hydroxyethyl(meth)acrylate, alkyl substituted acrylamides, (meth)acrylates, N-vinyllactanes (e.g., n-vinyl-2-pyrrolidone), and the like.

These monomers possess the appropriate water solubility for polymerization to take place.

DESCRIPTION OF THE PREFERRED EMBODIMENTS

The following examples illustrate the present invention, without; however, limiting the same hereto.

EXAMPLE 1

Synthesis

A representative example for the synthesis of the intramolecular polymer complexes (designated 136A) is outlined below.

Into a 1-liter, 4-necked flask add:
12.08 g methacrylamidopropyltrimethylammonium chloride (MAPTAC), 50% aqueous solution
5.64 g sodium styrene sulfonate (SSS)
35.0 g acrylamide (AM)
300 ml. distilled water or on a molar basis
5.0 moles MAPTAC
5.0 moles SSS
90.0 moles AM We should emphasize that the anionic and cationic monomers were added to the aqueous phase without attempting to form ion-pair comonomers that do not possess nonpolymerizable counterions.

The solution was purged with nitrogen gas for approximately one hour to remove dissolved oxygen. As the nitrogen gas purging began, the solution is heated to 50° C. At this point, 0.1 g potassium persulfate (i.e., initiator) was added to the solution. After 8 hours, the polymer was precipitated from solution with acetone. Subsequently, the resulting polymer was washed several times with a large excess of acetone and dried in a vacuum oven at 60° C. for 24 hours.

The composition of 136A is as follows:
$x = 0.90$
$Y + Z = 0.082$
$A = 0.018$

Note that the polymer structure has 1.8 mole % "excess" nonpolymerizable free charge attached to some of the styrene sulfonate units.

EXAMPLE 2

A further representative example for the synthesis of an intramolecular polymer complex (designated 136B) is similar to Example 1, except for the initial monomer feed composition. This is outlined below.

- 34.6 g methacrylamidopropyltrimethylammonium chloride, 50% aqueous solution
- 5.76 g sodium styrene sulfonate
- 35.0 acrylamide or on a molar basis

- 5.0 moles MAPTAC
- 7.0 moles SSS
- 88.0 moles AM

The composition of 136B is as follows:
$x = 0.887$
$Y + Z = 0.087$
$B = 0.026$

Note that the polymer structure has 2.6 mole % "excess" nonpolymerizable free charge attached to some of the MAPTAC units.

EXAMPLE 3

A further representative example for the synthesis of an intramolecular polymer complex (designated 136C) is similar to Example 1, except for the initial monomer feed composition. This is outlined below.

- 45.5 g methacrylamidopropyltrimethylammonium chloride, 50% aqueous solution
- 5.9 g sodium styrene sulfonate
- 35.0 g acrylamide or on a molar basis

- 5.0 moles MAPTAC
- 9.0 moles SSS
- 86.0 moles AM

The composition of 136C is as follows:
$x = 0.871$
$Y + Z = 0.091$
$B = 0.038$

Again, it should be noted that the polymer structure has 3.8 mole % "excess" nonpolymerizable free charge attached to some of the MAPTAC units.

136A is best described an an intrapolymer complex with a modest amount of anionic charge, while 136B and 136C terpolymers contain increasing amounts of cationic charge.

As is well known to those versed in the art, the level of ionic monomers incorporated in the growing polymer chain is directly related to the initial concentration of the reacting species. Therefore, modulation of the ionic charge within the polymer structure is accomplished through changes in the initial anionic and/or cationic vinylic monomer concentrations.

We would also recognize that the above described polymers are only one example of a whole family of water-soluble polymers capable of possessing high degrees of acid, base, or salt tolerance in solution. The major requirement is the availability of water-soluble (and polymerizable) anionic, cationic, and neutral vinylic monomers.

EXAMPLE 4

In FIGS. 1 and 2 are typical data of the viscosity-polymer concentration behavior of fresh water (FIG. 1) and 1 molar sodium chloride solutions (FIG. 2) containing the above described polymers, i.e., 136A, 136B and 136C.

The 136B data show a decrease in viscosity occurs at all polymer levels due to the dominant influence of the dissociabled charge over the intrapolymer complex i.e., $y + z < B$. The ratio $$(B/y + Z) = 0.3$$

in this instance.

The 136C data show the effect of significantly increasing the level of dissociable charge over the complex concentration, i.e., $$(B/y + Z) = 0.42$$

As the salt level is increased, the viscosity values deteriorate rapidly at all polymer concentrations. That is, this polymer is behaving as a classical polyelectrolyte than an intrapolymer complex. More specially, the dissociable charges are largely dominating the solution behavior of this polymeric material.

The 136A data show the effect of lowering the $$(A/y + Z)$$

ratio, (=0.25), to a modest degree. The viscosity concentration profiles show that little change occurs with the addition of sodium chloride. Therefore, it is readily observed that this material possesses a very high degree of salt tolerance. Apparently, a balance is achieved between the influence of the dissociable charge and the intrapolymer complex structure on the hydrodynamic volume of the polymer chain.

In summary, what we claim is the synthesis of a water-soluble copolymer material possessing a high degree of salt tolerance, such as in 136A. This material contains a balance between the influence of the highly mobile dissociable charges and the anionic-cationic monomer complex structure. The latter structures allow the hydrodynamic volume of the polymer to increase with addition of a soluble, low molecular weight additive. The former charges cause the chain to shrink upon acid, base, or salt addition. If an "imbalance" between these two factors exist, then the viscosity will increase or decrease accordingly (136B and 136C). In addition, although the molecular weight, complex composition, dissociable charge structure, and charge density can be varied over a relatively wide range, substantially different and improved salt tolerance results as compared to conventional homogeneously-charged polyelectrolytes and previously described intrapolymer complexes.

What is claimed is:

1. A terpolymer having the formula:

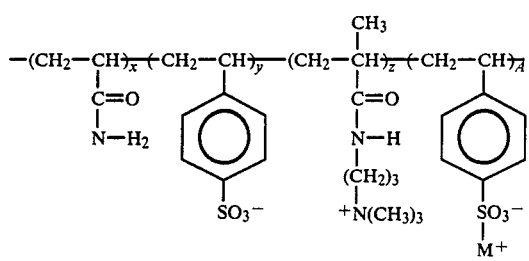

wherein x is 1 to 50 mole %, y is 1 to 50 mole %, z is 1 to 50 mole %, y is equal to z, A is 1 to 25 mole %, wherein A, y and z are less than 50 mole % and the ratio of A/y+z is 0.25 to 15, and M is selected from the group consisting of amines and a metallic cation being selected from the group consisting of lead, iron, aluminum, Groups IA, IIA, IB and IIB of the Periodic Table of Elements.

2. A terpolymer according to claim 1 wherein M is sodium.

3. A terpolymer according to claim 1 wherein said terpolymer possess a nonstoichiometric amount of anionic groups.

4. A terpolymer according to claim 1 wherein said terpolymer is readily soluble or dispensible in fresh water.

5. A terpolymer according to claim 1 wherein said terpolymer possesses enhanced solvent thickening efficiency in acid, base, or salt solution as compared to homogeneously charged copolymers.

6. A terpolymer according to claim 1 wherein said terpolymer is derived from water soluble noionic, anionic and cationic monomers.

7. A terpolymer having the formula:

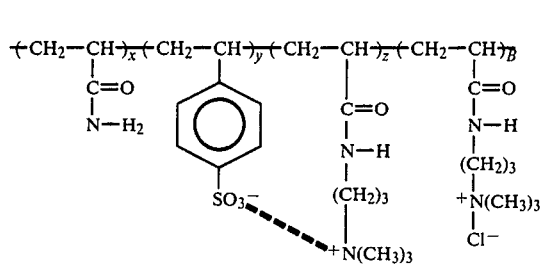

wherein x is 1 to 50 mole %, y is 1 to 50 mole %, z is 1 to 50 mole %, y is equal to z, B is 1 to 25 mole %, wherein B, y and z are less than 50 mole % and the ratio of B/y+z is 0.25 to about 15.

8. A terpolymer according to claim 7 wherein said terpolymer possesses a nonstoichiometric amoung of cationic group.

9. A terpolymer according to claim 7 wherein said terpolymer is readily soluble or dispensible in fresh water.

10. A terpolymer according to claim 7 wherein said terpolymer possesses enhanced solvent thickening efficiency in acid, base, or salt solution as compared to homogeneously charged co polymers.

11. A terpolymer according to claim 7 wherein said terpolymer is derived from water soluble nonionic, anionic and cationic monomers.

* * * * *